April 2, 1968   G. R. KINGSBURY ET AL   3,375,563

METHOD OF MAKING DUAL-MATERIAL FLANGE BEARINGS

Filed Jan. 28, 1966

INVENTORS
GEORGE R. KINGSBURY
CHARLES H. JUNGE
WILLIAM A. WEINKAMER
RAYMOND L. SLATER

BY

Eber J. Hyde
ATTORNEY

3,375,563
METHOD OF MAKING DUAL-MATERIAL FLANGE BEARINGS

George R. Kingsbury and Charles H. Junge, Cleveland, William A. Weinkamer, Mentor, and Raymond L. Slater, Novelty, Ohio, assignors to Clevite Corporation, a corporation of Ohio
Filed Jan. 28, 1966, Ser. No. 523,657
10 Claims. (Cl. 29—149.5)

This invention relates to a method of making dual-material flange bearings, and to the bearings produced thereby. Reference is made to copending application Ser. No. 397,251, filed Sept. 17, 1964, now Patent No. 3,251,119, entitled, "Method of Making Dual-Material Flange Bearings," and Ser. No. 500,065, filed Oct. 21, 1965, now Patent No. 3,350,763, entitled, "Method of Making Dual-Material Flange Bearings," and assigned to the same assignee as the present invention.

Dual-material flange bearings are engine bearings which incorporate the features of a strong, high-load-carrying capacity barrel liner which has good, fatigue-resistant properties, combined with a soft babbitt or white metal flange or thrust face which has a superior surface action characteristic for resistance to seizure and which has a high degree of conformability, while still maintaining sufficient, inherent, load-carrying capacity to withstand lesser thrust loads.

The dual-material flange bearing is particularly adapted for automotive applications, for example, engine sleeve bearings, wherein it is highly desirable to have the plane of the flange face, or faces, perpendicular to the axis of the barrel. In the past, the importance of this relationship had been recognized, but in mass production, at low cost, it is impossible always to achieve a perfectly perpendicular condition.

In the dual-material flange bearing of the present invention, as well as the aforementioned applications, the barrel liner is made of a high-load-carrying bearing material, with or without an overlay plate, and the flange face(s) is made of conformable, cast white metal or babbitt having excellent surface action properties. The high degree of metal conformability on the flanges permits the axis of the assembled bearing bore and the plane of the flange faces to be off-perpendicular within reasonable tolerances for inexpensive mass production. In addition, the babbitt or white metal adhered to the flanges provides a high degree of conformability, such that the surface roughness of the mating runner is not so critical, thus reducing the manufacturing cost of the mating engine counterpart. Because the flanges do not have to withstand the high unit cyclic loads experienced by the bore face of the bearing, the usage of cast conformable white metal or babbitt on the flange faces improves the bearing action thereof and also solves the problem of conformability and misalignment.

The present bearing differs from the aforementioned bearings in that the overall wall thickness of the flange face is of greater magnitude than the overall wall thickness of the barrel liner. This permits inexpensive, yet accurate, mass production.

It is therefore an object of the present invention to provide a dual-material flange bearing and a method of making the same wherein the bearing material of the barrel is formed of a high-load-carrying capacity material and herein the bearing material of the flange, or flanges, is made of a conformable white metal such as babbitt, and the flange thickness is greater than the thickness of the barrel.

Another object of the present invention is to provide methods of making a dual-material flange bearing where the overall flange thickness is of greater magnitude than the overall barrel thickness.

Another object of the present invention is to provide several methods for manufacturing the strip material from which dual-material flange bearings may be made, and wherein the bearings made from the strip will have greater flange thickness than barrel thickness.

For a better understanding of the present invention, together with other and further objects thereof, reference is made to the following description taken in connection with the accompanying drawings, and its scope will be pointed out in the appended claims.

With reference to the drawings, there is shown in

FIGURE 1 a perspective view of a typical flange bearing;

Figure 1:
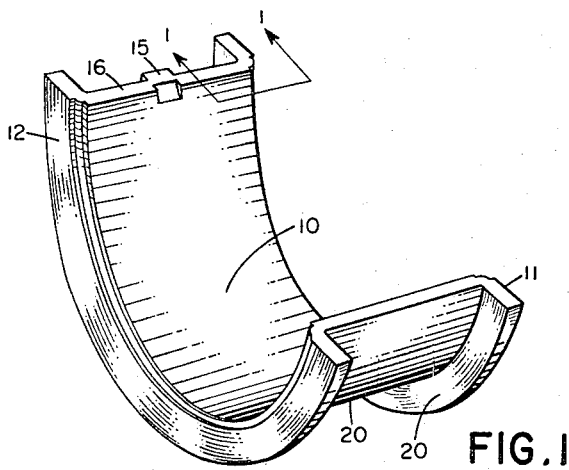
FIGURE 1a is a detailed, sectional view through FIGURE 1 on the plane of the line 1—1 showing the details of various metallic layers.

With reference to the drawings, there is shown in FIGURE 1 a dual-material flange bearing. The bearing is comprised of a barrel or radial load-carrying portion 10 and one or more flanges or thrust faces 11, 12, the planes of which should be perpendicular to the axis of the barrel 10. A notched portion 15 is provided on one or more of the parting line faces 16 to locate the bearing into position in the assembled unit, as is well known in the automotive art.

Figure 1A:
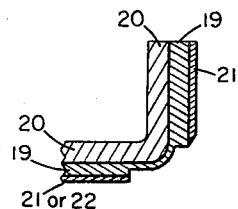

FIGURE 1a shows the bearing to be comprised of a steel backing layer 20 at both the barrel and flange portions. To the steel backing layer 20 at the flange faces 11 and 12 is adhered a conformable layer of white metal or of lead or tin-base babbitt 21, with a thin layer of bronze 19 between the steel and the conformable layer 21. To the steel backing layer 20 at the barrel portion 10 is adhered a layer 19 of strong, high-load-carrying bearing material which layer 19 may or may not be provided with a micro-thin plated layer 22 or cast layer 21 of bearing material on the surface thereof. The overall thickness of the flange, including the steel backing layer 20, intermediate layer 19, and the conformable layer 21 is greater than the overall thickness of the barrel. Because of the greater overall flange thickness, this bearing configuration can only be used in those situations where the engine design so dictates. In most present-day engine designs, it is required that the flange and barrel thicknesses be the same. However, there has been a recent trend towards this type of configuration in several instances. A dual-material bearing of this configuration is significantly less expensive to produce on a mass-production basis than with any of those methods being utilized today. It will be essential, however, in many instances that the engine designers redesign the flange portion of the engine casing before this configuration can be employed.

Figure 2:
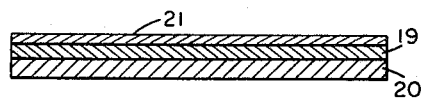
FIGURE 2 is a transverse, sectional view showing an early step in the method of making the composite strip material from which the bearing shown in FIGURE 1 may be made.
Figure 5:
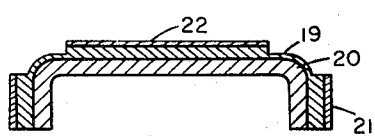
FIGURE 5 is a sectional view similar to FIGURE 4 after the bearing material in the barrel area has been reduced sufficiently to remove the cast overlay, and subsequently electro-deposited thereon, resulting in the barrel area bearing material being of substantially lesser thickness than the bearing material in the flange area.

FIGURES 2–5 show a method by which the dual-material flange bearing may be produced where an essentially heavy-duty, fatigue-resistant material 19 is used on the barrel portion of the bearing and conformable cast white metal bearing material 21 is used on the flange portion of the bearing. As shown in FIGURE 2, a composite, tri-metal strip is worked upon in various steps depicted by FIGURES 3–5. Onto the top surface of the steel strip 20 is adhered a layer of heavy-duty material 19. Subsequently, a second layer of soft, conformable, white metal bearing material 21 is cast on top of the heavy-duty material 19. Methods are known and well developed for adhering the heavy-duty material to the steel and for casting the white metal on the heavy duty bearing material. In a subsequent machining operation the strip shown in FIGURE 2 is channeled 24 or coined the entire length of the strip, as shown in the FIGURE 3 transverse sectional view. Following the channeling operation shown in FIGURE 3, the bearing strip is formed into a plurality of blanks by transversely cutting the strip at the appropriate places. After the blanking step, the blank is formed into the final, desired, general bearing shape shown in FIGURE 4. Following this forming step, the white metal portion 21 of the barrel area means 10 and flange area means 11, 12 is worked upon so that the remaining white metal portion 21 of the barrel area means 10 is completely removed, resulting in a bearing material of substantially lesser thickness than the bearing material at the flange area means 11, 12. Preferably, the white metal may be completely removed at the barrel area and a precision overlay of bearing metal 22 is subsequently electro-deposited thereon, as shown in FIGURE 5. In the alternative, a thin white metal overlay 21 is allowed to remain in the barrel area. This results in a finalized, overall flange thickness of greater magnitude than the finalized, overall barrel thickness.

Figure 6:
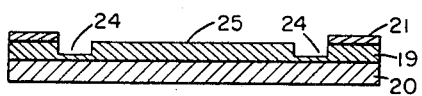
FIGURE 6 is a sectional view similar to FIGURE 3 depicting an alternative manufacturing method whereby the channeling operation and bearing material reduction operation are performed simultaneously or sequentially prior to blanking the bearing out of the strip.
Figure 3:
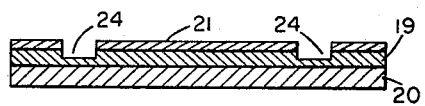
FIGURE 3 is a sectional view similar to FIGURE 2 after a grooving or channeling operation has been performed on the strip.
Figure 7:
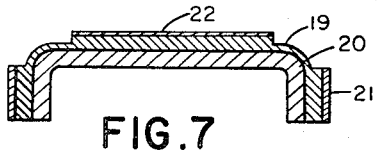
FIGURE 7 is a sectional view after the bearing has been blanked out of the strip shown in FIGURE 6, formed, and the barrel area has been plated.
Figure 4:
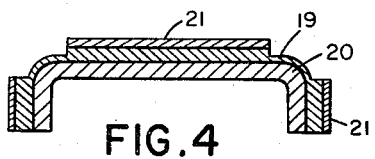
FIGURE 4 is a sectional view after the bearing has been blanked out of the strip shown in FIGURE 3, and formed.

FIGURES 6 and 7 show an alternative manufacturing method whereby, in a single operation, the channeling 24 may be combined with complete white metal removal in the barrel area 25 so as to produce the transverse cross-sectional profile shown in FIGURE 6. This single operation may be performed on the strip or on the bearing blank after it has been cut from the strip. If the removal is performed in the strip form, the strip is subsequently blanked and formed into the final, desired, general bearing shape shown in FIGURE 7. If this single operation is performed on the bearing blank, it is only necessary to then form the prepared blank into the final, desired bearing shape. Preferably, following obtaining the final, general bearing shape shown in FIGURE 7, a precision overlay of white metal 22 is electro-deposited on the barrel area. Alternatively, only a portion of the white metal in the barrel area may be removed during the combined operation, leaving a thin, fatigue-resistant layer of white metal which exhibits the same qualities of seizure-resistance and conformability exhibited by the bearing material on the flange area means.

To provide an inexpensive, dual-material flange bearing, several alternatives of the basic invention may be employed. Basically, the invention disclosed is that of reducing the conformable white metal bearing material to a substantially greater degree at the barrel area means as opposed to the flange area means. This can be accomplished with the bearing in its strip form, or after blanking, or with the bearing blank in a formed semi-finished state. With any of these methods the hard, intermediate bearing material may be selected from any of a known group of heavy-duty bearing materials, including cast aluminum, cast aluminum alloy, clad aluminum, clad aluminum alloy, cast bronze, sintered bronze, and sintered copper-tin infiltrated with babbitt, but not limited thereto, or may be selected from any future-developed, heavy-duty materials.

The term "white metal bearing material" is understood to include lead and tin-base babbitts for bearing applications and it also includes the other low-melting point bearing materials and alloys such as antimony, bismuth, and cadmium. Alloys including zinc are also included, although zinc itself is not a good bearing material.

With any of the methods employed to accomplish the basic invention, the formed, machined flanges will have a relatively thicker remaining layer of white metal than the barrel portion to insure a good surface quality to resist seizure and conform to any thrust runner misalignment. The heavy-duty, cyclically loaded barrel portion of the bearing is finish machined to remove all or most of the white metal in the area of the strong, intermediate bearing alloy in the barrel area. After removing all the conformable white metal bearing materials from the barrel, a thin, electro-deposited layer of plated bearing metal can be adhered to the barrel. Or, a thin, fatigue-resistant layer of white metal can be allowed to remain on the barrel. This white metal exhibits the same qualities of seizure-resistance and conformability exhibited and sought for the flange area means.

In accordance with the invention, there is provided a method of producing a thin-walled, steel-backed, dual-material flange sleeve bearing from a strip of steel. The process comprises the steps of applying a strong, fatigue-resistant, relatively hard bearing material to the surface of said steel strip to cause said strong bearing material to adhere thereto. The strong bearing material portion of the strip is worked to form barrel area means and flange area means of substantially the same thickness. A white metal bearing material which is more conformable and is relatively softer than the strong, fatigue-resistant bearing material is cast upon the strip, resulting in a composite, tri-metal strip having barrel area means and flange area means of substantially the same thickness. The white metal bearing material at the barrel area means is worked to a substantially lesser thickness than the white metal bearing at the flange area means. This may be done in the strip form or after blanking. A flange sleeve bearing is then formed with the barrel area means and the flange area means forming the barrel and flange means of the bearing. In the alternative, the sleeve bearing forming step may be preformed prior to working the white metal bearing material.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:
1. The method of producing a thin-walled, steel-backed, dual-material, flange sleeve bearing from a strip of steel which comprises the steps of: applying to the surface of said steel strip a layer of strong, fatigue-resistant, relatively hard bearing material to cause said strong bearing material to adhere thereto; in the strip form, working the strong bearing material to form barrel area means and flange area means of substantially the same thickness; in the strip form, casting white metal bearing material which is conformable and relatively softer than the strong, fatigue-resistant bearing material to form a composite tri-metal strip having barrel area means and flange area means of substantially the same thickness; working the white metal bearing material at the barrel area means to a substantially lesser thickness than the white metal bearing material at the flange area means; and forming a flange sleeve bearing with the barrel area means of said strip forming the barrel of said bearing and with the flange area means of said strip forming the flange means of the bearing.

2. The method of producing a thin-walled, steel-backed, dual-material, flange sleeve bearing, as set forth in claim 1, further characterized by: following the obtaining of a composite tri-metal strip having barrel area means and flange area means of substantially the same thickness, forming a flange sleeve bearing with the barrel area means of said strip forming the barrel means of said bearing and with the flange area means of the strip forming the flange means of the bearing; and removing at least a substantially greater portion of the conformable cast white metal bearing material from the barrel portion than from the flange portion of the bearing whereby the barrel portion of the formed bearing is formed essentially of strong bearing material and the surface of the flange means is formed of said conformable white metal bearing material.

3. The method of producing a thin-walled, steel-backed, dual-material, flange sleeve bearing as set forth in claim 1, further characterized by: finish machining the conformable cast white metal bearing material at the barrel portion of the bearing and at the flange portion of the bearing to cause the barrel portion of the formed bearing to be formed essentially of strong bearing material and to cause the surface of the flange portion to be formed of said conformable white metal bearing material.

4. The method of producing a thin-walled, steel-backed, dual-material, flange sleeve bearing, as set forth in claim 1, further characterized by: moving the strip, and continuously machining the moving strip to reduce the cast white metal at the barrel area means to a substantially lesser thickness than the conformable cast white metal at the flange area means.

5. The method of producing a thin-walled, steel-backed, dual-material, flange sleeve bearing, as set forth in claim 1, further characterized by: selecting the relatively hard bearing material from the group consisting of cast aluminum, cast aluminum alloy, clad aluminum, clad aluminum alloy, cast bronze, sintered bronze, and sintered copper-tin infiltrated with babbitt.

6. The method of producing a thin-walled, steel-backed, dual-material, flange sleeve bearing, as set forth in claim 1, further characterized by: machining the entire conformable white metal bearing material from the barrel area means thereby exposing the strong, fatigue-resistant, relatively hard bearing material layer; and electro-depositing a thin layer of conformable white metal material thereon to provide the barrel area means with good, fatigue-resistant properties.

7. The method of producing a thin-walled, steel-backed, dual-material, flange sleeve bearing, as set forth in claim 1, further characterized by: machining sufficient cast white metal bearing material from the barrel area means to provide a thin, remaining layer of cast babbitt exhibiting good, fatigue-resistant properties.

8. The method of producing a thin-walled, steel-backed, dual-material, flange sleeve bearing, as set forth in claim 1, further characterized by: following the obtaining of a composite tri-metal strip having barrel area means and flange area means of substantially the same thickness, cutting said composite tri-metal strip transverse to its length to form a plurality of bearing blanks each having flange area means and barrel area means, thereafter machining the conformable cast white metal portion of the blank at its barrel area means to a substantially lesser thickness than the conformable cast white metal bearing material of the bearing blank at its flange area means.

9. The method of producing a thin-walled, steel-backed, dual-material, flange sleeve bearing, as set forth in claim 8, further characterized by: forming a flange sleeve bearing into the desired, general bearing shape from one of said bearing blanks; and then machining the white metal portion of the so-formed bearing blanks at its barrel area means to a substantially lesser thickness than the white metal portion of the formed bearing blank at the flange area means.

10. The method of producing a thin-walled, steel-backed, dual-material, flange sleeve bearing, as set forth in claim 8, further characterized by: machining the white metal bearing portion of the bearing blank at its barrel area means to a substantially lesser thickness than the white metal bearing portion of the bearing blank at its flange area means; and thereafter, forming the machined bearing blank into a flange sleeve bearing.

References Cited

UNITED STATES PATENTS

| 2,124,060 | 7/1938 | Gilman | 29—149.5 |
| 2,124,132 | 7/1938 | Bate et al. | 29—149.5 |
| 3,251,119 | 5/1966 | Kingsbury et al. | 29—149.5 |
| 3,300,836 | 1/1967 | Slater et al. | 29—149.5 |
| 3,300,838 | 1/1967 | Slater et al. | 29—149.5 |

THOMAS H. EAGER, *Primary Examiner.*